United States Patent [19]
Hesse et al.

[11] Patent Number: 5,950,010
[45] Date of Patent: *Sep. 7, 1999

[54] SYSTEM AND METHOD FOR CUSTOMIZED APPLICATION PACKAGE BUILDING AND INSTALLATION

[75] Inventors: Frederick W. Hesse, Littleton; Patti J. Kato, Denver, both of Colo.

[73] Assignee: J.D. Edwards World Source Co., Denver, Colo.

[*] Notice: This patent issued on a continued prosecution application filed under 37 CFR 1.53(d), and is subject to the twenty year patent term provisions of 35 U.S.C. 154(a)(2).

[21] Appl. No.: 08/756,067

[22] Filed: Nov. 25, 1996

[51] Int. Cl.$^6$ ................................................ G06F 9/445
[52] U.S. Cl. .............................. 395/712; 709/220; 713/1
[58] Field of Search ................................ 395/712, 200.5, 395/200.51, 200.52, 651, 652, 653; 709/220, 221, 222; 713/1, 2, 100

[56] References Cited

U.S. PATENT DOCUMENTS

| | | | |
|---|---|---|---|
| 5,432,941 | 7/1995 | Crick et al. | 395/651 |
| 5,524,246 | 6/1996 | Hurley et al. | 395/651 |
| 5,666,501 | 9/1997 | Jones et al. | 395/200.52 |
| 5,671,420 | 9/1997 | Bell et al. | 395/712 |
| 5,684,996 | 11/1997 | Westerholm et al. | 395/712 |
| 5,694,546 | 12/1997 | Reisman | 395/712 |
| 5,715,463 | 2/1998 | Merkin | 395/712 |
| 5,721,824 | 2/1998 | Taylor | 395/712 |
| 5,734,822 | 3/1998 | Houha et al. | 395/200.5 |

OTHER PUBLICATIONS

"Microsoft Systems Management Server", Microsoft Corporation, Redmond, WA, 1994.
"Microsoft Systems Management Server for Windows NT Administrator's Guide", Document No. 66254, Microsoft Corporation, Redmond, WA, 1993–1995.
"Future–Proof Solutions", J.D. Edwards & Co., Denver, CO, 1995.
"Case Tools and 4GLs: The Enterprise Distinction", J.D. Edwards & Co., Denver, CO, 1995.
"OneWorld and the Event–Driven Model", J.D. Edwards & Co., Denver, CO, 1995.
"OneWorld Integrated Toolset Highlights", J.D. Edwards & Co., Denver, CO, 1995.

*Primary Examiner*—Eric W. Stamber
*Attorney, Agent, or Firm*—Fenwick & West LLP

[57] ABSTRACT

A system for building and installing custom application packages in a distributed computing environment that includes a server computer and a client computer coupled through a network. The server computer includes a storage media subsystem, a build subsystem, and a server package storage, all of which are coupled together. The client computer includes a storage media subsystem, an installation subsystem, and a local application package storage, all of which are coupled together. Application packages are created through the build subsystem by bundling one or more application modules and/or application executables together using and then storing the application packages in the server package storage. The application packages are then installed through the installation subsystem on the client computer in the local application storage. The present invention also includes a method for building and installing custom application packages on a client computer.

10 Claims, 12 Drawing Sheets

| OBJECT LIBRARY LIST ~710 | 730 | 740 |
|---|---|---|
| SUITE 720 | MODULE | FORMS (WINDOW) |
| 06 (PAYROLL) | P0610 (TIME ENTRY) | W0610A (ENTER DATA) |
| 06 (PAYROLL) | P0610 (TIME ENTRY) | W0610B (REV PROJ) |
| 06 (PAYROLL) | P0615 (PAYROLL RUN) | R0615A (CHECK PRT) |
| 06 (PAYROLL) | P0620 (HISTORY) | W0620A (EMPL HIST) |
| 06 (PAYROLL) | P0620 (HISTORY) | W0620B (PROJ HIST) |
| 09 (GEN ACCT) | P0910 (GEN LEDGER) | W0910A (DAILY LEDGE) |
| 41 (INVENTORY) | P4110 (STOCK) | W4110A (CURR STK) |

FIG. 7

| PACKAGE LIST ~810 | | | | |
|---|---|---|---|---|
| PACKAGE 820 | DESCRIPTION 830 | OBJECTS 840 | OBJ TYPE 850 | PK TYPE 860 |
| ALL | ALL SOFTWARE | *ALL | SY | |
| 06 | PAYROLL | 06 | SY | |
| 41 | INVENTORY | 41 | APPL | |
| 41U | INVENTORY UPDATE 1 | P41100 | APPL | U |
| 41U | INVENTORY UPDATE 2 | P41200 | APPL | U |
| 41PLUS | INVENTORY PLUS | 41 | SY | |
| | TIME ENTRY | P0610 | APPL | |
| 06PLUS | PAYROLL PLUS | 06 | SY | |
| | MS EXCEL | EXCEL.EXE | EXE | |
| SPECL | SPECIAL APPS | P0650 | APPL | |
| | | P0655 | APPL | |
| COMBINE | ACCOUNTING PLUS | 03 | SY | |
| | SPECIAL APPS | SPECL | PKG | |

FIG. 8

FIG. 10
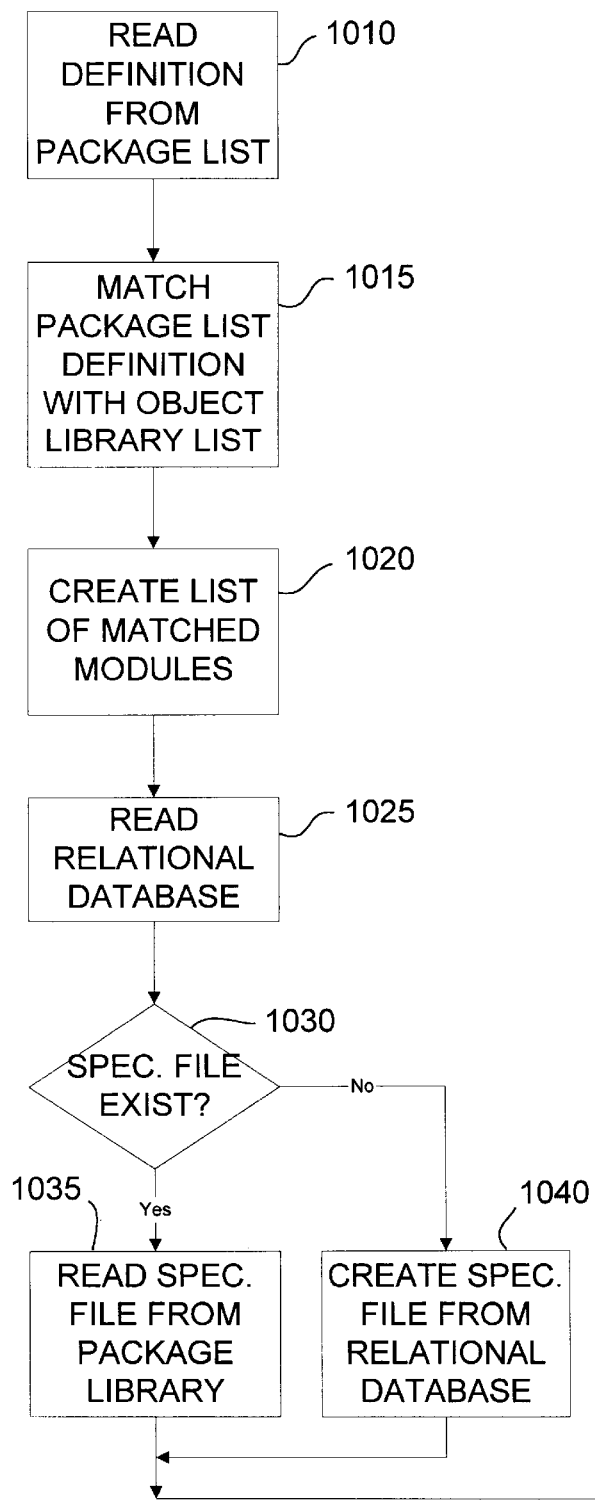
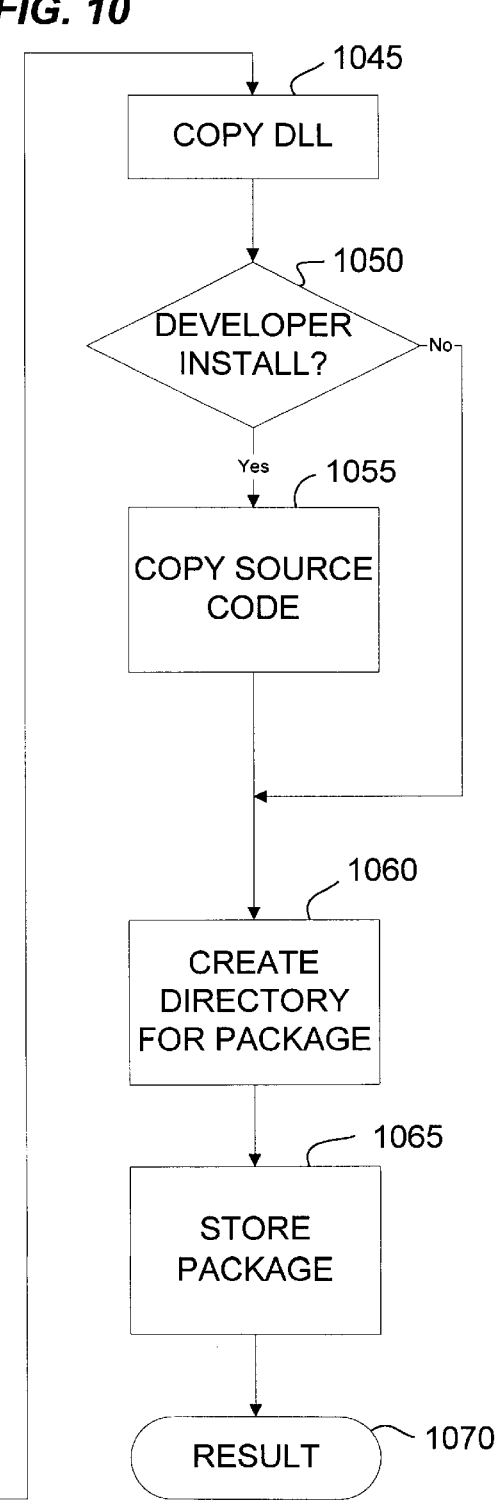

| DEFINE USERS 1110 | | |
|---|---|---|
| USERID 1120 | DESCRIPTION 1130 | SECURITY 1140 |
| ALLENR | ALLEN, RAY | 3 |
| BROWNJ | BROWN, JOE | 5 |
| COURTA | COURT, ANN | 3 |
| ... | ... | ... |
| JONESS | JONES, SALLY | 4 |
| ... | ... | ... |

*FIG. 11*

| DEFINE PACKAGES TO USERS 1210 | |
|---|---|
| USERID 1120 | PACKAGE 820 |
| ALLENR | 06 |
| BROWNJ | 41PLUS |
| COURTA | 06 |
| | 41PLUS |
| ... | ... |
| JONESS | *ALL |
| | 41PLUS |
| | 06PLUS |

*FIG. 12*

SYSTEM AND METHOD FOR CUSTOMIZED APPLICATION PACKAGE BUILDING AND INSTALLATION

CROSS REFERENCE TO RELATED APPLICATIONS

The subject matter of this application is related to the subject matter of U.S. patent application Ser. No. 08/740,360, entitled "SYSTEM AND METHOD FOR INSTALLING APPLICATIONS ON AN AS NEEDED BASIS", filed on Oct. 28, 1996, by Glenn S. Yinger, Charles E. McVaney, and James L. Foos.

BACKGROUND OF THE INVENTION

1. Field of the Invention

This invention generally relates to the field of data processing systems and, more specifically, to the field of building and installing custom application packages in a distributed computing environment.

2. Description of the Related Art

Modern data processing systems are often implemented as distributed computing environments. A typical distributed computing environment configuration includes one or more "client" computers, including personal computers and workstations, that communicate with one or more "server" computers. In this "client/server" environment, the client computers request data, files, or other information from the server computer and the server computer serves the client with the requested information. In some distributed computing environments, a computer may operate as a client computer and as a server computer.

In many modem client/server environments, the number of application suites, or products, necessary to perform business tasks is becoming increasingly large. In some client/server environments all the components of an application bundle are installed on each client computer's storage device. Thus, as the number and size of the application bundles increases, the amount of space necessary to store the application bundle becomes increasingly large. In many instances not every user requires an entire application bundle installed on the client computer, particularly those users involved with doing specific tasks versus system-wide tasks.

Recognizing this problem, some modern data processing systems have environments in which the full application bundle is broken into smaller components, specifically application suites. For example, the software may include one application suite of each Sales Order Processing, Payroll, Human Resources, and Budgeting, rather than a single application bundle encompassing all four application suites. The problem, however, with the prior art systems is that the application suites are not further broken into a sufficient number of individual components so that portions of each suite may be installed and available to users who do not require access or should not have access, to an entire application suite. For example, an order entry clerk in an organization probably would not require access to an entire payroll application, despite having to enter his or her working time entries (which is typically part of the payroll suite). Thus, the clerk would simply forward his time entry to one having the payroll application so that person may enter the time, rather than having the entire payroll application installed on the clerk's client computer.

Therefore, there is a need for a system that customizes an application package for particular users using components from one or more application suites and/or components of one or more third-party applications. Further, there is a need for a system to install or update an application package without having to update every application and every client computer having an assigned user in the network and without having to recompile an entire application suite.

SUMMARY OF THE INVENTION

In general, the system of the present invention includes a distributed computing system having at least one server computer and at least one client computer coupled by a network. The system of the present invention builds custom computer application packages which are then installed from a server computer to a client computer.

The server computers include application suites, application packages, and commercially-available applications. The application suites relate to enterprise functions such as payroll, inventory, accounts payable, and budgeting. The application suites are further defined by application modules or programs that include data or information that is usually specific to the particular application suite to which the application module is associated. For example, the payroll suite may include a time entry application module and an address application module, as well as a compensation application module, all of which are required to process a payroll in an enterprise.

The application packages are comprised of one or more application modules or programs from the one or more application suites. The application packages may include only particular application modules from one or more application suites, but not an entire application suite, or may include one or more entire application suites plus particular application modules from other application suites.

The system of the present invention builds an application package by linking various application modules, the various application suites, and/or various commercially-available applications and then providing select system users access to the newly built application package. The application package is then installed over the network on the select users' client computers. Thus, the select users are given access to particular application modules without requiring access to and installation of the entire application bundle just to get access to a particular application module.

The present invention includes a method to build application packages. The method includes the steps of defining an application module, storing the application module, selecting the application module from a list of application modules and adding the selected application module to the application package. This process is continued until all the application modules necessary to create an application package are added to the application package list. After all the application modules sought are added, the application package is linked together and the application package is assigned to selected users in the master file. The application package is then installed at the client computer of the selected user authorized to install the application package.

The system and method of the present invention offer an advantage of installing particular application modules or group of modules for a user of a client/server system without requiring an entire application suite to be installed to be able to have access to the particular application module. A benefit of the system and method of the present invention is that fewer system resources, such as client computer storage space, are required for operation. Another benefit is an additional layer of system security is introduced because not every application module of an application suite is required to be installed on a client computer when a user needs access to a particular application module.

The features and advantages described in the specification are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

FIG. 7 is a table of an object librarian list in accordance with the present invention;

FIG. 8 is a table of a package list in accordance with the present invention;

FIG. 10 is a flow diagram illustrating a process for building an application package in accordance with the present invention;

FIG. 11 is a table for user definitions of users in the client/server system in accordance with the present invention; and FIG. 12 is a table for defining application packages to users of the client/server system in accordance with the present invention.

DESCRIPTION OF A PREFERRED EMBODIMENT

Figure 1A:
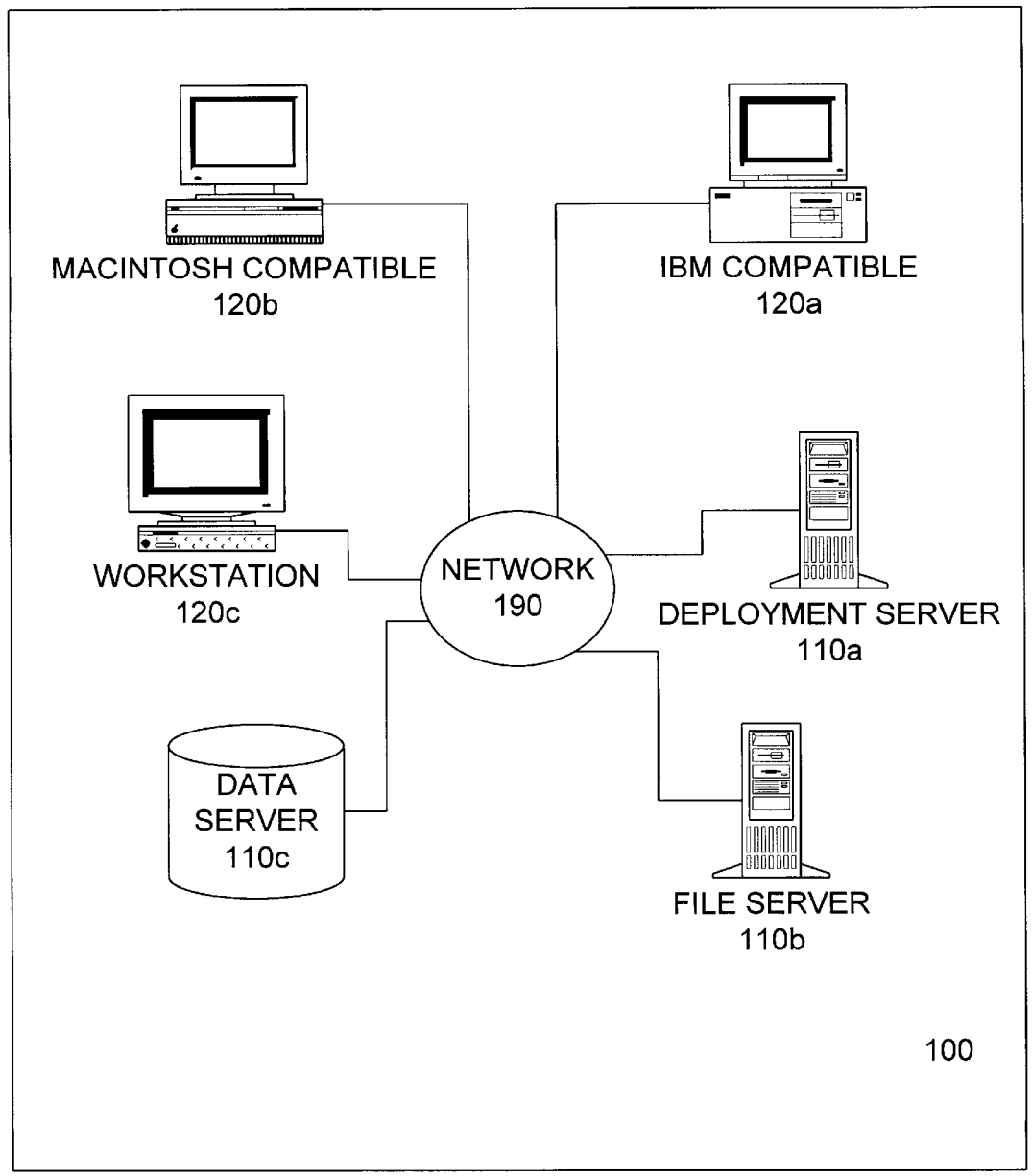
FIG. 1A is a block diagram illustrating a client/server system in accordance with the present invention.

The present invention provides a system and method for bundling various computer applications or application modules together to build an application package, and installing the application package on a computer, such as client computers 120a–120c in FIG. 1A, in a distributed computing environment. FIG. 1A is a block diagram illustrating a client/server system 100 for data processing in accordance with the present invention. The client/server system includes server computers 110a–110c and client computers 120a–120c connected through a network 190. Each connection on the network 190 may be referred to as a node. It is noted that the server computers 110a–110c may also operate as client computers and the client computers 120a–120c may also operate as server computers in the client/server system 100.

Figure 1B:
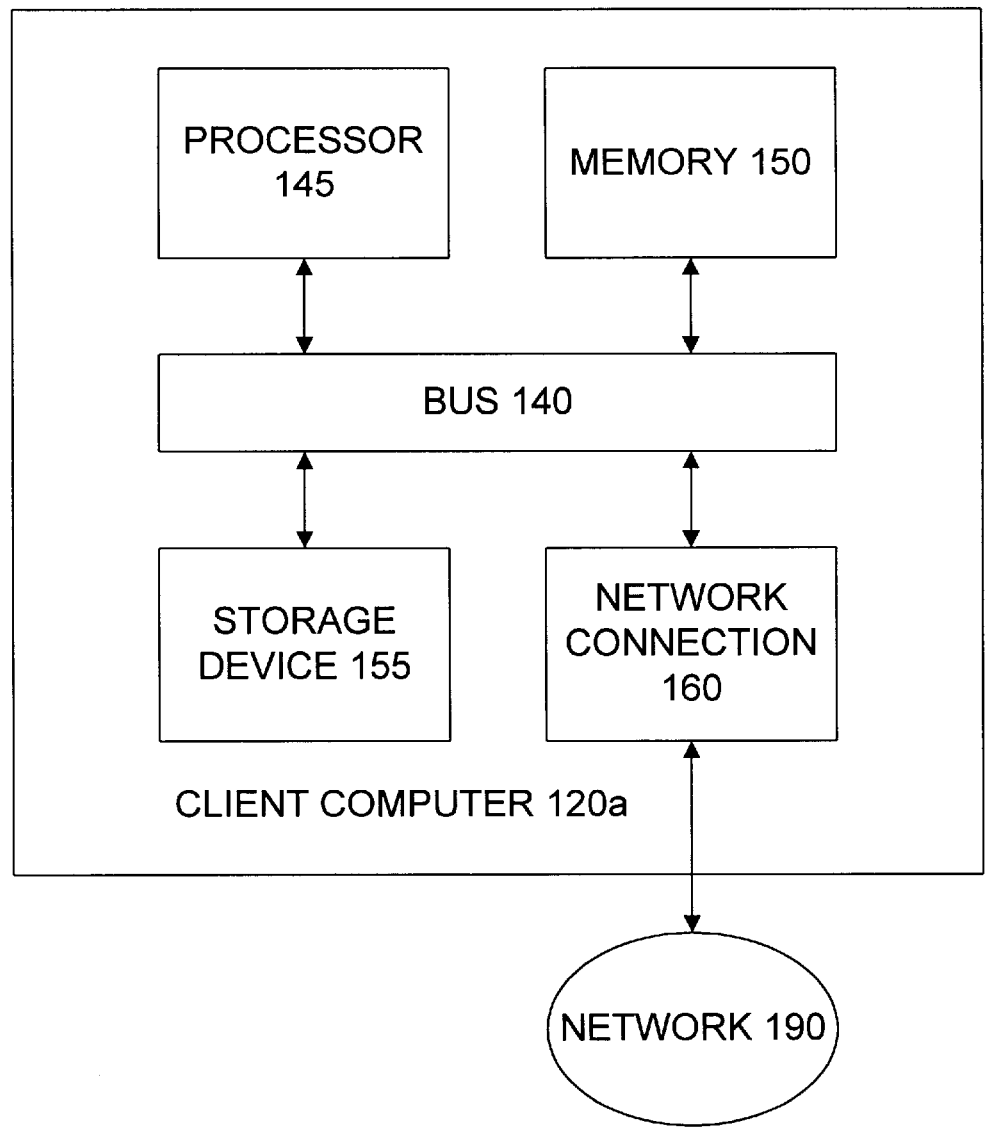
FIG. 1B is a block diagram illustrating components of a client computer in accordance with the present invention.

In a preferred embodiment of the present invention, the client computers 120a–120c are conventional personal computers or workstation machines having conventional hardware components such as a bus 140, a processor 145, a memory 150, a storage device 155, and a network connection 160, as illustrated in FIG. 1B. The processor may be a conventional processor that is commercially available such as a Pentium™ processor by Intel Corporation (Santa Clara, Calif.), a PowerPC™ processor by IBM Corporation (Armonk, N.Y.) or Motorola, Inc. (Schaumburg, Ill.), an Alpha™ processor by Digital Equipment Corporation (Maynard, Mass.), or a SPARC™ processor by Sun Microsystems, Inc. (Mountain View, Calif.). The client computers 120a–120c use conventional software operating environments that are commercially available such as Microsoft Windows™ from Microsoft Corporation (Redmond, Wash.), Apple System 7.x from Apple Computer, Inc. (Cupertino, Calif.), or Unix-based operating systems. In various embodiments, the client computers 120a–120c connected to the network 190 may be of the same or different hardware and software platform types.

The server computers 110a–110c may be conventional personal computers, workstation machines, mid-range computer platforms, or large system computer platforms. The server computers 110a–110c have conventional hardware components, such as those illustrated for the client computer 120 in FIG. 1B, including a bus, a processor, a memory, a storage device, and a network connection. The server computers 110a–110c use conventional software operating environments depending on the available hardware platform. For example, an OS/400 operating system is used on an AS/400™ mid-range computer by IBM Corporation (Armonk, N.Y.), a HP-UX operating system is used on an HP-9000™ mid-range computer by Hewlett-Packard Corporation (Palo Alto, Calif.), a Microsoft Windows NT™ operating system is used on an Alpha™ System by Digital Equipment Corporation (Maynard, Mass.), or a MVS or VM operating system is used on an ES/9000™ large system computer by IBM Corporation (Armonk, N.Y.). The server computers 110a–110c may also operate on other conventional software operating environments such as Microsoft Windows or Unix-based operating systems. Similar to the client computers 120a–120c, the server computers 110a–110c connected to the network 190 may, in various embodiments, be of the same or different hardware and software platforms.

The network 190 interconnects the client computers 120a–120c and the server computers 110a–110c. In a preferred embodiment the network 190 is a conventional logical network such as a local area network ("LAN") or a wide area network ("WAN"), as appropriate for the particular embodiment in which the system 100 is to operate. In accordance with the present invention, the logical network is physically implemented using commercially available conventional network hardware and software such as a file server computer using a Novell NetWare™ from Novell Corporation (Provo, Utah) or Microsoft Windows NT™ from Microsoft Corporation (Redmond, Wash.) network operating system software.

In a preferred embodiment of the present invention, the server computers include application suites and application packages. The application suites relate to computer application programs that perform enterprise functions such as payroll, inventory, accounts payable, and budgeting. The application suites are further defined by individual applications or application modules that include data or information that is usually specific to the particular application suite to which the application module is associated. For example, the payroll suite may include a time entry application module and an address application module, as well as a compensation application module, all of which are required to process a payroll in an enterprise.

The application packages are comprised of one or more application modules or programs from the one or more application suites. The application packages may include only particular application modules from one or more application suites, but not an entire application suite, or may include one or more entire application suites plus particular application modules from other application suites. Further, each application module is comprised of a logical group of forms that are associated with specific application functions or elements, such as data entry or file browsing. In addition, an application may be a third-party application such as a Microsoft Word word processor from Microsoft Corporation (Redmond, Wash.), or a graphics package such as Corel Draw from Corel Corporation (Ottawa, Canada). As will be further described below, the system and method of the present invention configures application packages from the applications and application modules in the client server system 100 for installation in the client/server environment.

Figure 2:
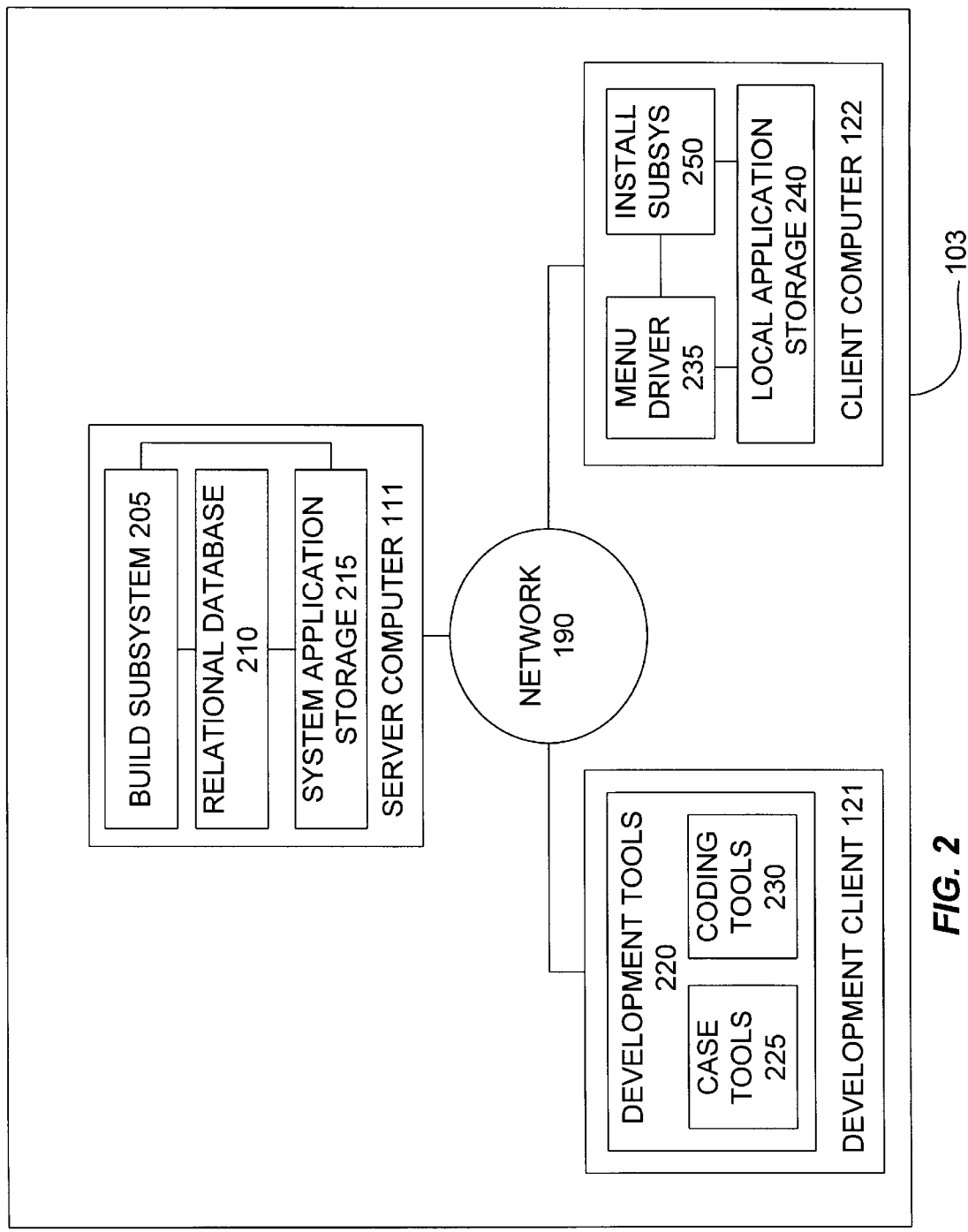
FIG. 2 is a block diagram illustrating a custom application package building and installation system in accordance with the present invention.

FIG. 2 is a block diagram illustrating a custom application package building and installation environment 103 in accordance with the present invention. The custom application package building and installation environment 103 operates within the client/server system 100. The custom application package building and installation environment 103 includes a server computer 111, that is functionally equivalent to one or more of the server computers 110a–110c of the client/server system 100, a development client computer 121 and a user client computer 122, both of which are functionally equivalent to one or more of the client computers 120a–120c of the client/server system 100, and the network 190 for connecting the various computers to one another.

In a typical client/server environment, there are one or more application bundles (not illustrated). An application bundle is a combination of enterprise type application suites bundled together. An example of an application bundle is a bundle for operating a manufacturing facility, that may include individual application suites for payroll, accounting, inventory, and the like. Thus, the application bundle is comprised of one or more application suites and is not broken down any further. Referring briefly to FIGS. 5A and 5B, in the client/server system 100 an application suite or system code 510 is an enterprise type application such as a payroll application 512, an inventory application, or a sales order application. Each application suite 510 is comprised of one or more application modules or programs 520 such as a time entry module 522, history review module 524, or payroll run module 526 within a payroll application suite 512. Each application module 520 is further comprised of forms 530a, 530b that define particularities of an application module 520 such as a data entry field, an application window size, or an interaction button for doing a task. For example, the payroll run module 526 includes a time entry data form 532, a review project form 534, and a check print form 536. The forms are defined by a set of specification information, of which a master copy of the specification information is stored on the server computer 111. An application package is comprised of one or more application modules of various application suites, either alone or in combination with entire application suites, as further described below in FIGS. 4 through 8.

Turning back to FIG. 2, the server computer 111 includes a build subsystem 205, a system application storage 215, and a file structure for storage, such as a relational database 210, all of which are coupled together. The build subsystem 205 assembles application packages for the client/server system 100. The file structure for storage may be any file structure that allows for indexing application components such as executables, specifications and file lists. Indexing identifies which files are associated with a particular application module 520. In a preferred embodiment, the file structure is the relational database 210. The relational database 210 stores the specification information for the application modules in the client/server system 100. In a preferred embodiment, the relational database 210 is implemented by a conventional relational database such as SQL Server from Microsoft Corporation (Redmond, Wash.), Oracle7 from Oracle Corporation (Redwood Shores, Calif.), or DB2 from IBM Corporation (Armonk, N.Y.). The system application storage 215 is a files segment where applications, including application package components, are stored. The build subsystem 205, the relational database 210, and the system application storage are all stored on the storage medium of the server computer 111.

The development client computer 121 includes development tools 220 that are used for creating the application modules or other application components for the client/server system 100. The development tools 220 are comprised of computer assisted software engineering ("CASE") tools 225 as well as coding tools 230. The CASE tools 225 are used to create and design an application module and the coding tools 230 are used to generate and compile the programming code for the created application module. Both the CASE tools 225 and the development tools 230 are further described in FIG. 4 below. The development tools 220 are stored on the storage device of the development client computer 121.

The user client computer 122 includes a menu driver 235 and a local application storage 240 that are coupled to one another. The menu driver 235 provides the executable code to launch application programs on a client computer 122 or to launch a server application from the server computer 111 in the client/server system 100. The local application storage 240 is where application packages located on the client computer 122 are stored. The user client computer 122 also includes an installation subsystem 250 that is coupled to the menu driver 235 and the local application storage 240. The installation subsystem 250 is used to install application packages on the user client computer 122. In a preferred embodiment, the installation subsystem 250 may reside on the server computer 111. When an application is ready for installation, the installation subsystem 250 is loaded into the memory 150 of the client computer 122 from the server computer 111 to run the installation process from the client computer 122. In an alternative embodiment, the installation subsystem 250 may reside and be run from the server computer 111. The menu driver 235, local application storage 240, and the installation subsystem 250 are stored on the storage device 155 of the user client computer 122.

Figure 3:
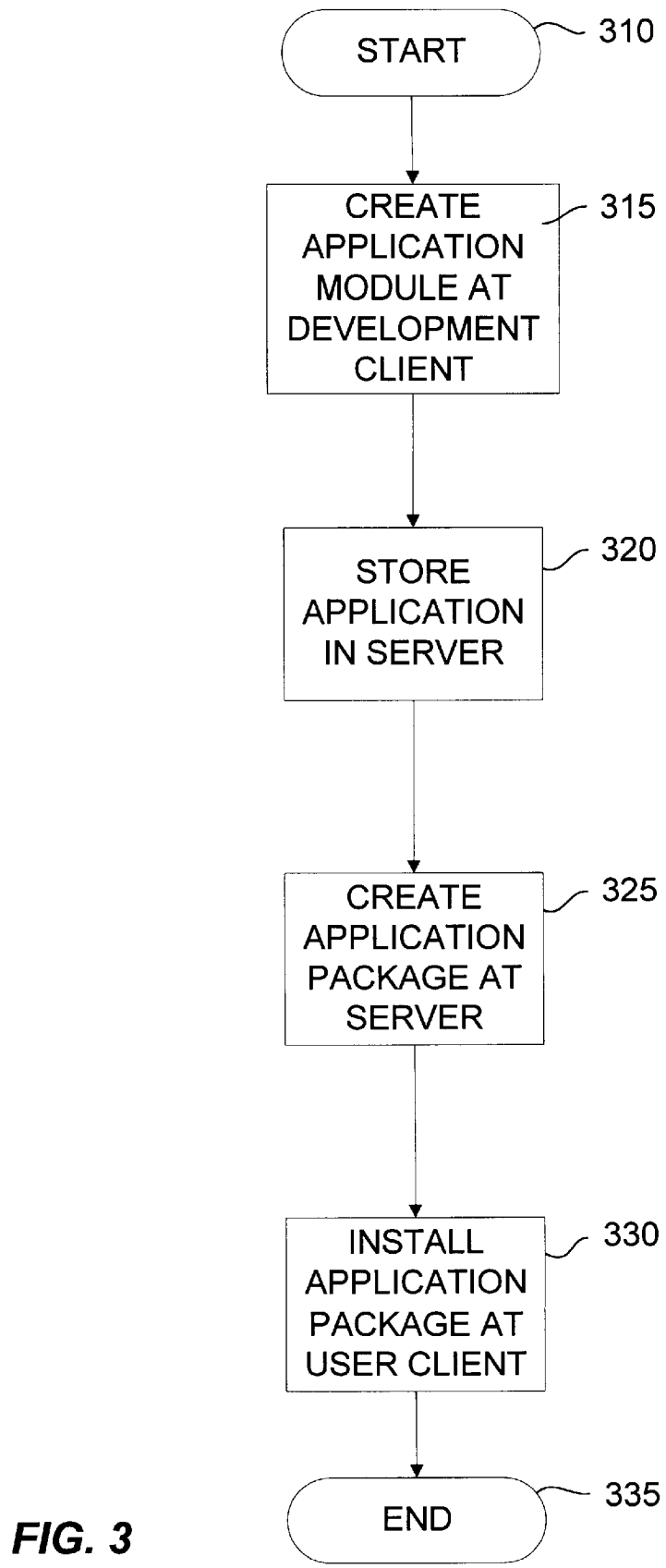
FIG. 3 is a flow diagram illustrating an overview of custom application package building and installation process in accordance with the present invention.

FIG. 3 is a flow diagram illustrating an overview of a process for building and installing application packages using the custom application package building and installation environment 103 of FIG. 2 in accordance with the present invention. Once the custom application package building and installation environment 103 starts 310 operation, an application module is created 315 at the development client computer 121 using the development tools 220 at the client computer 121. Once the application module has been created 315, the application module is stored 320 in the server computer 111. Specifically, the application module code is stored in the system application storage 215 and the application module specifications are stored in the relational database 210. The build subsystem 205 at the server computer 111 then creates 325 or builds an application package that is also stored in the system application storage 215. The application package is installed 330 at the user client computer 122 using the installation subsystem 250 for selecting the application package and having the application package stored in the local application storage 240.

Figure 4:
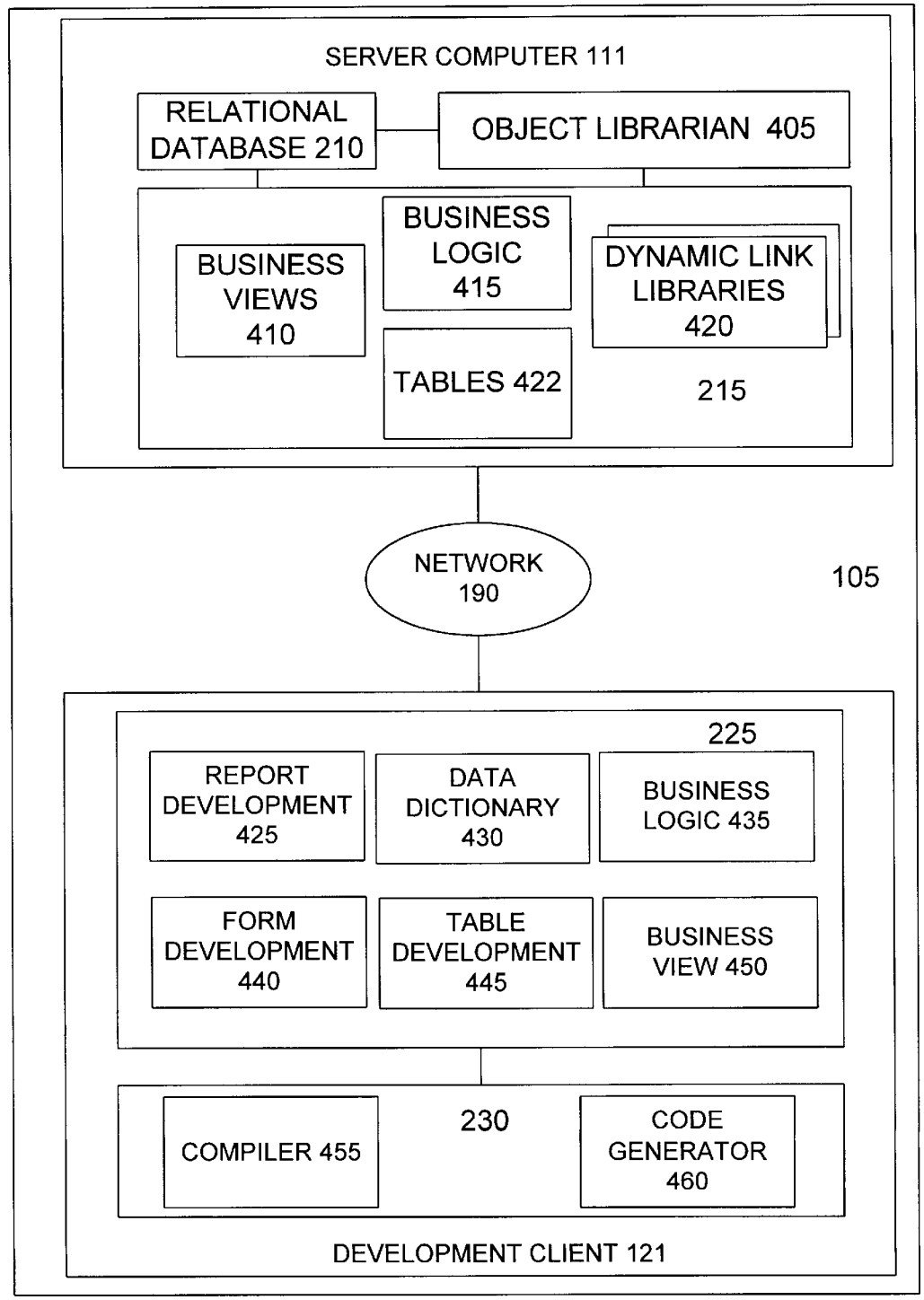
FIG. 4 is a block diagram illustrating an application module development system in accordance with the present invention.
Figure 5A:
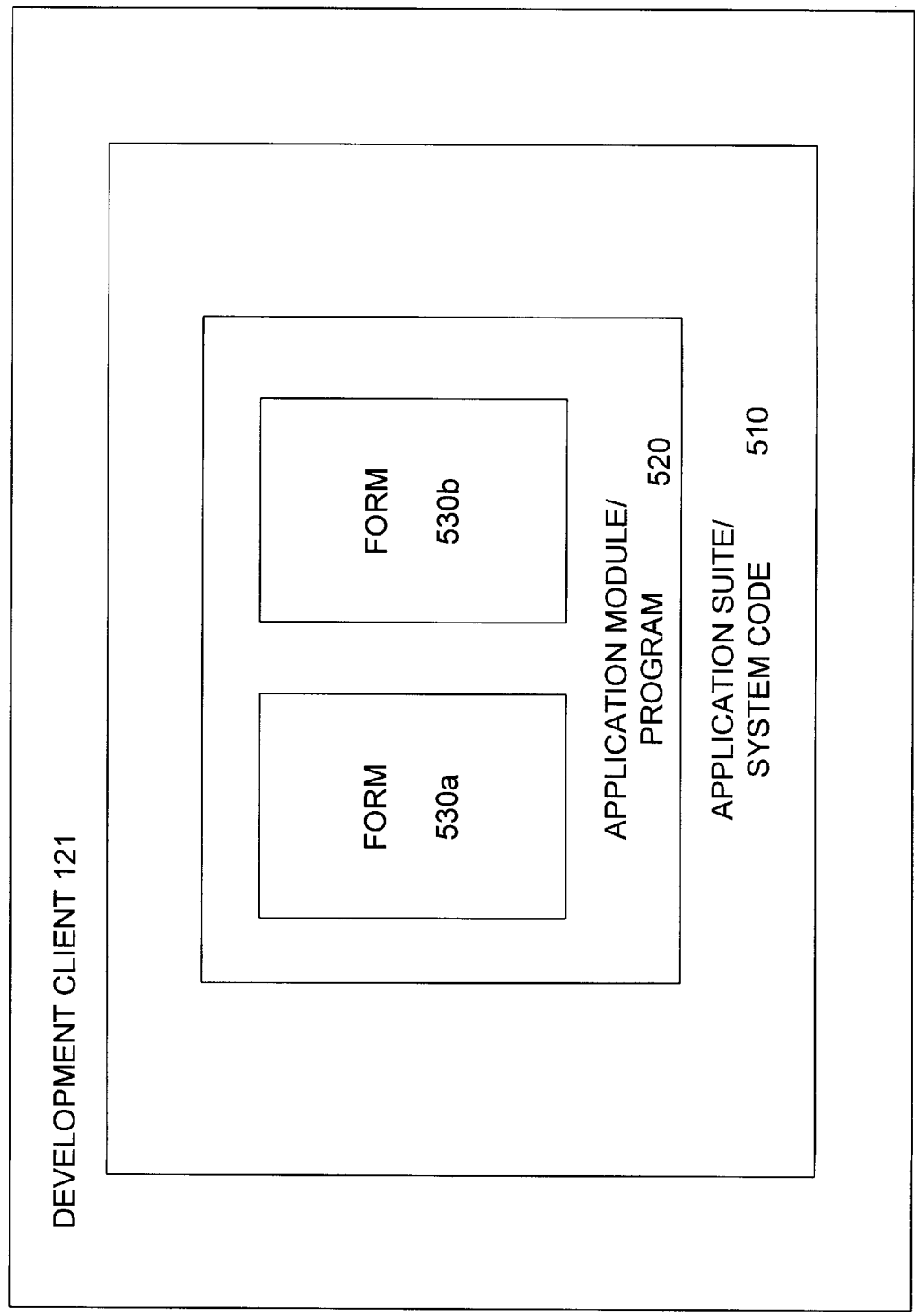
FIGS. 5A and 5B are block diagrams illustrating layers within an application suite in accordance with the present invention.
Figure 5B:
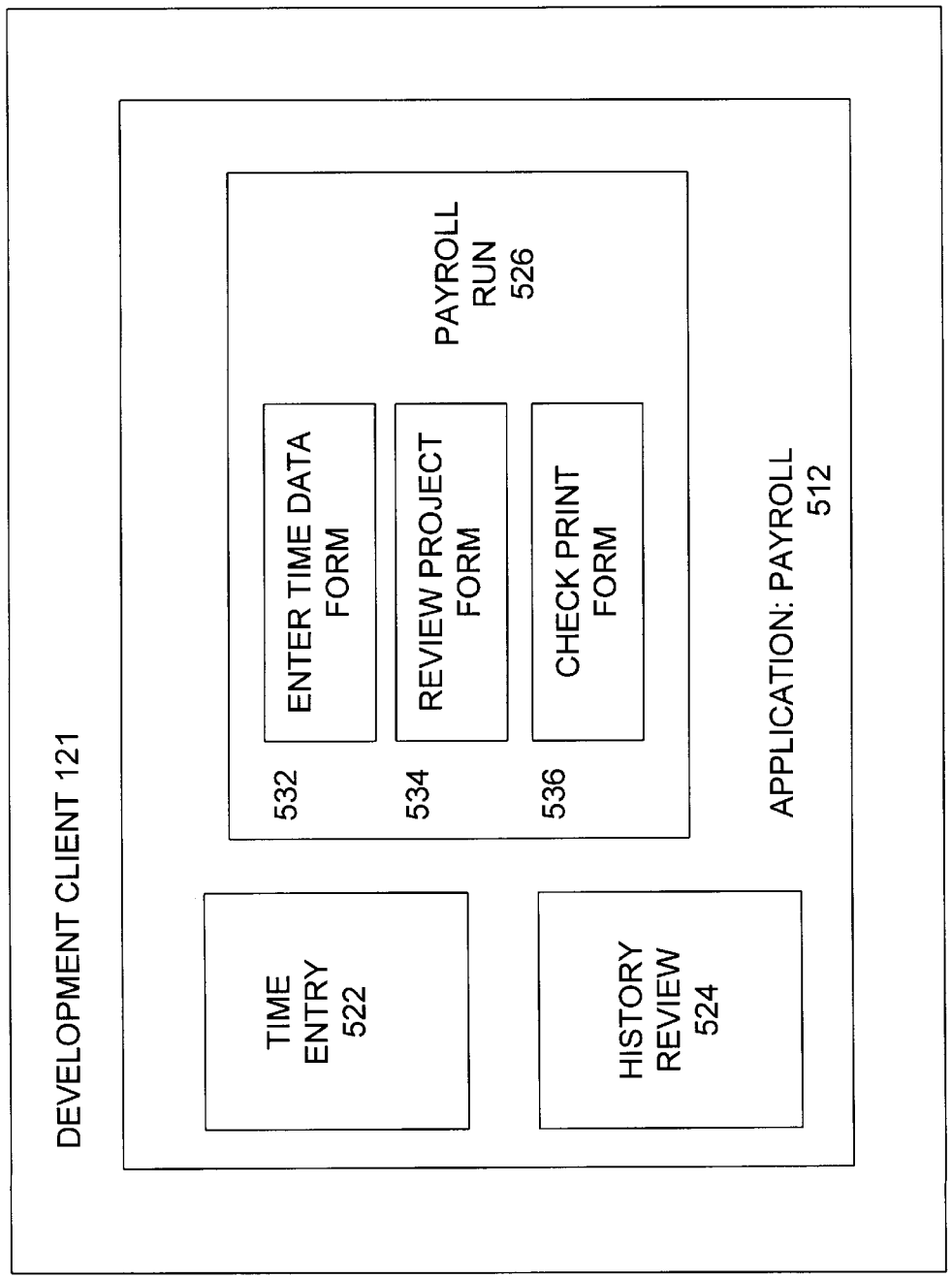

FIG. 4 is a block diagram illustrating an application module development system 105 in accordance with the present invention. The application module development system 105 includes the server computer 111 and the development client computer 121 coupled together by the network 190. The server computer includes an object librarian 405, the relational database 210, and the system application storage 215, all of which are coupled to one another. The relational database 210 provides tables for the client/server system 100 such as payroll data, as well as a list of available application packages on the client/server system 100 and a list of users of the client/server system 100. The object librarian 405 provides an inventory of executables and files associated with an application module. The system application storage 215 includes business views 410, business logic 415, dynamic link libraries ("DLL") 420, and tables 422.

The client computer 121 includes the CASE tools 225 and the coding tools 230. The CASE tools 225 include a report development tool 425, a data dictionary tool 430, a business logic tool 435, a form development tool 440, a table development tool 445, and a business view tool 450. The coding tools 230 include a compiler 455 and a code generator 460. The CASE tools 225 provide the toolset for creating an application module, including the window sizes, data entry fields, data links, interaction buttons and the like. The coding tools 230 provide the toolset for generating C code and compiling the generated C code to produce the application module.

FIGS. 5A and 5B, as described above, are block diagrams illustrating layers within an application suite that may be created using the application module development system 105 of FIG. 4. Specifically, the application module development system 105 creates the application module 520 that may be part of an application suite 510. Each application module 520 is comprised of the forms 530a, 530b that define the application module in terms of window size, data entry fields, screen buttons, and the like.

Figure 6:
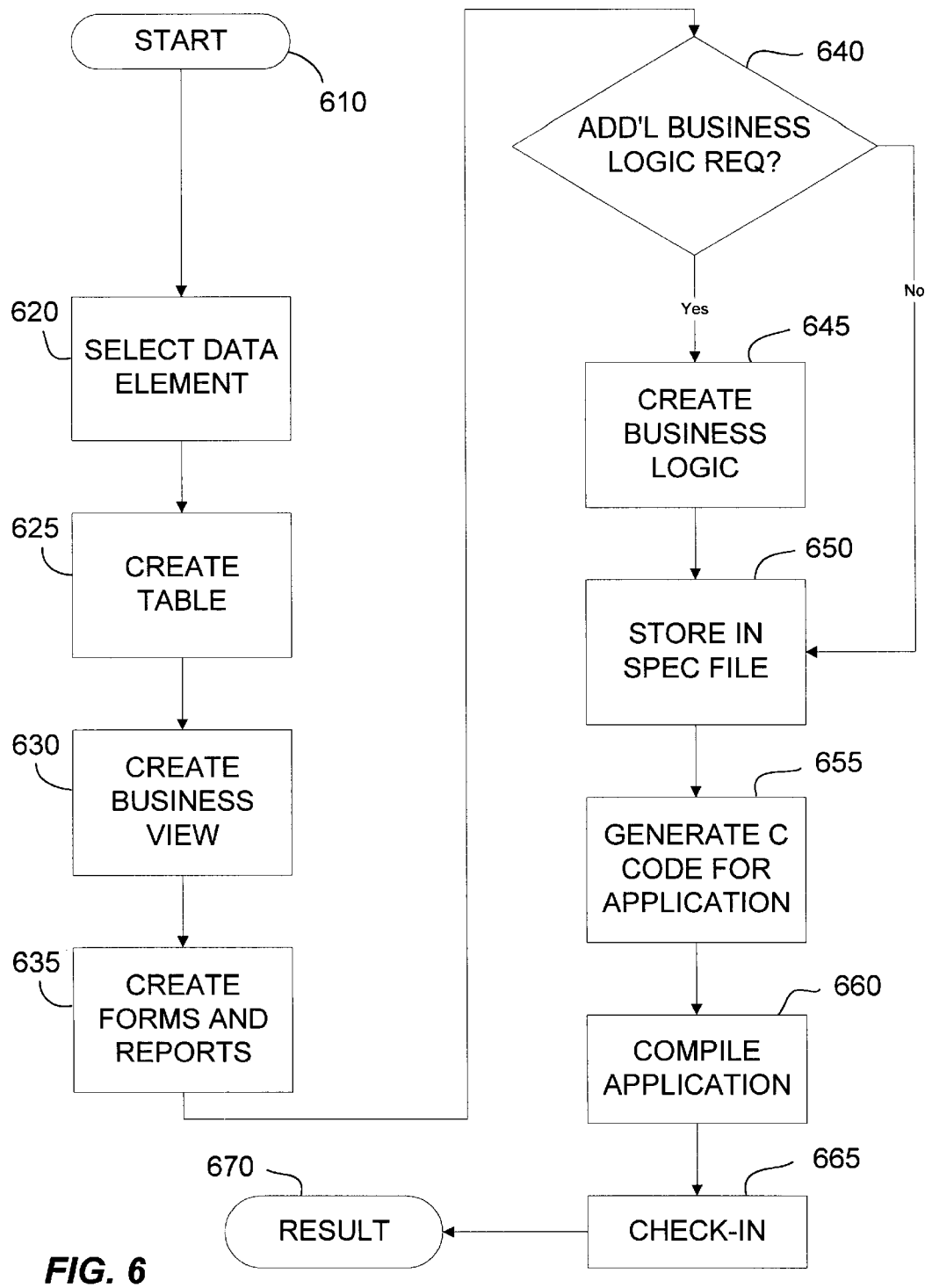
FIGS. 6 is a flow diagram illustrating a process of assembling application modules in accordance with the present invention.

FIG. 6 is a flow diagram illustrating a process of assembling application modules using the application module development system 105 of FIG. 4. To begin creating the application module, one or more data elements is first selected 620 from the data dictionary tool 430. Data elements include data items, such as data entries, data files, data functions, or other information, that are used throughout the system. For example, in a business application module, suite, or bundle, an employee name would be one data element and an employee number would be another data element. An advantage of having data elements defined in the data dictionary tool 430 is that a data element that is repeatedly called by an application module, suite, or bundle is not multiplied unnecessarily.

Once the data elements are selected 620, a table is created 625 using the table development tool 445. The development tool 445 is also used to define indexes for the newly created table. The development tool 445 is also used to create the physical tables in the relational database 210. The definition for the table is stored in a table access management ("TAM"), which is further described below. When the application module is checked into the server computer 111, the parameters from the TAM file structure are stored in the relational database 210 on the server computer 111. The data is accessed through a business view that is created 630 from the business view tool 450. Creating 630 a business view involves selecting and presenting subsets of the table created 625 by the table development tool 445. For example, a time entry field for the payroll application suite 512 may only need certain subsets of the table such as time entry related fields versus salary related fields. The business view tool 450 creates a relational database sequence from which data elements may be selected. Once the business views are created 630, forms and reports are created 635 for accessing the data elements for the application module. Forms are created using the form development tool 440 and, as described above, provide an interface to the data elements. Forms are typically used in an interactive application environment. Reports are created using the report development tool 425. Reports provide a presentation of the data to the user once the user selects, through the forms, data elements sought from the application.

The CASE tools described above provide functionality for selecting data, placing fields on a screen, and as well as providing simple logic functions such as adding two numbers together and placing the result in a third field. In some instances, however, more advanced business functions are desired for parts of a form which are too complex for the existing CASE tools. In such instances a business logic tool 435 is used to create 645 the business function necessary to complete the form. A business function is a program that can be used and accessed by multiple applications. A business function includes special logic for conducting operations such as retrieving data from other files, undertaking table manipulation including updates and deletions, calculations or other data manipulation, and data retrieval. For example, there may be a requirement for taking two numbers and selecting a function call that calculates the third partial derivative from an equation involving the two numbers. The calculations for the third partial derivative would be a business function that is created 645 using the business logic tool 435. Other examples of business functions that can be created through the business logic tool 435 include credit checks, inventory adjustment posts to the general ledger, and calculating average costs.

In a preferred embodiment, the business logic tool 435 uses C programming language for defining the business function to be incorporated into an application. In an alternative embodiment, the business function may be incorporated into an application using any computer programming language that supports building a dynamic link library ("DLL").

After the business logic has been created 645, the particulars of the application are stored. Specifically, the particulars include the information related to an application which are stored in various specification files. There is a separate specification file for the data dictionary elements, the reports, the tables, the forms, the business views, and the business logic. In a preferred embodiment, each specification file is a table access management ("TAM") file structure. The TAM file structure is a tree hierarchy format that includes a record type identification field, a record control field, and data text as described above. The TAM file is organized to provide the record type, for example a form or a report, or the record control, for example push button operations or drop down box operation, followed by text string(s) associated with the record type or record control that preceded the text.

The TAM files are sent through a code generator 460 that reads the TAM file and generates 655 C programming language code for the application module. The C coded file is then compiled 660 by a compiler 455 to create a DLL file that is used in the execution, or running, of the application module and which can operate using the information in the TAM files. Each time a new application module is created, C code is generated 655 and the C coded file is then compiled to create a new DLL file that is used for executing the application module and can use the appropriate information located within the TAM files associated with the application module. In a preferred embodiment, the compiler is a commercially-available compiler such as a Microsoft C Compiler from Microsoft Corporation (Redmond, Wash.).

In an alternative embodiment, the specification file for an application coded using other application creation products, databases, or data access products including Excel by Microsoft Corporation (Redmond,. Wash.), 1–2–3 or Approach by Lotus Development Corporation (Cambridge, Mass.), or Paradox by, Borland Corporation (Scotts Valley, Calif.), are stored in a file format specified by those products. Applications created using alternative application creation products may or may not require C code generation and/or compilation depending on how those particular products store and access data elements during interactions from each product's own form.

The DLL file and its associated files, including the object file and the specification file, make up the components of the application module, e.g., 520. Before the application module can be accessed by an end user, it is checked-in 665 into the server computer 111. In the check-in 665 subprocess, the object librarian 405 inventories the application module including the DLLs and associated files that define the application module. Also during check-in 665, the TAM file information is read by the object librarian 405 and placed into the relational database 210 on the server computer 111. The DLLs for the applications are also read by the object librarian 410 and placed in the system application storage 215 of the server computer 111 storage device. In addition, source files for the business functions are placed in the system application storage 215.

FIG. 7 is a table illustrating an object librarian list 710 of the object librarian 405. It is noted that each table illustrated in the present invention is shown in English readable format, but may be encoded information readable by a computer. The object librarian list 710 provides a list of files that are stored in the object librarian 405. The files are those associated with particular application modules, packages, suites, and other applications as is further described below. The object librarian list 710 includes an entry to identify an application suite such as the application suite 510 of FIG. 5A, an application module such as the application module 520 associated with the application suite 510, and one or more forms such as the forms 430 associated with the application module 520. For example, the payroll application suite 512 of FIG. 5B is identified as suite, or system code, number 06 in a suite 720 identification column of the object librarian list 710. Application modules associated with the payroll application suite and listed in a module 730 identification column are identified as P0610 for the time entry application module 522 and P0620 for the history review application module. The forms associated with each application module and listed in the forms 740 identification column are identified as W0610A for the time entry data form 532, W0610B for the review project form 534, and R0615A for the print check form 536. The object librarian list 710 illustrates an advantage of the application package building and installation environment 103 of identifying application suite components in discrete packets that will allow greater application installation flexibility as further described below.

FIG. 8 is a table illustrating a package list 810 of the application list subsystem 405. The package list 810 provides a list of objects that define application packages in the client/server system 100. Each application package includes some combination of application suites 510 and/or application modules 520 and/or program executables. Program executables include commercially available software applications such as Microsoft Word or Microsoft Excel from Microsoft Corporation (Redmond, Wash.), WordPerfect from Corel Corporation (Ottawa, Canada), and Lotus 1–2–3 from Lotus Development Corporation (Cambridge, Mass.).

The package list 810 is structured to include a package name 820 identification column, a description 830 of the defined package identification column, an objects 840 column associated with the package, an object types 850 identification column, and a package type 860 column. The objects are the individual application suites, application modules, or other file structure, such as a commercially available software application. The object types identify whether the object is an application suite, an application module, or some other file such as a program executable of a commercially available software application. The package type 860 column identifies whether the entire ("I") application package is to be installed or whether updated ("U") applications alone are to be reinstalled. An entire installation ("I") will lose existing application packages and install the new application packages. An update installation ("U") will install only the application portions that have changed. An advantage of this configuration is an application package may be selectively updated such that there is no need to install an entire application package when only the changed portions require reinstallation.

The present invention also allows application packages to be defined that will be bundled into other application packages. For example, if particular application modules are common to multiple application packages, a separate application package may be created that is comprised of the common application modules. This application package is then bundled as an object with the appropriate application packages to which it is to be assigned. For example, the package COMBINE includes an accounting application and special applications. The accounting application is identified as a 03 package which is an application suite or system (SY) object type and the special applications are identified as a SPECL package with a package (PKG) object type. An advantage of this configuration is that a group of application modules can be assigned to the appropriate application packages as a single bundle, such as the SPECL package, rather than requiring each application module to be assigned individually to each of the appropriate application packages.

Figure 9:
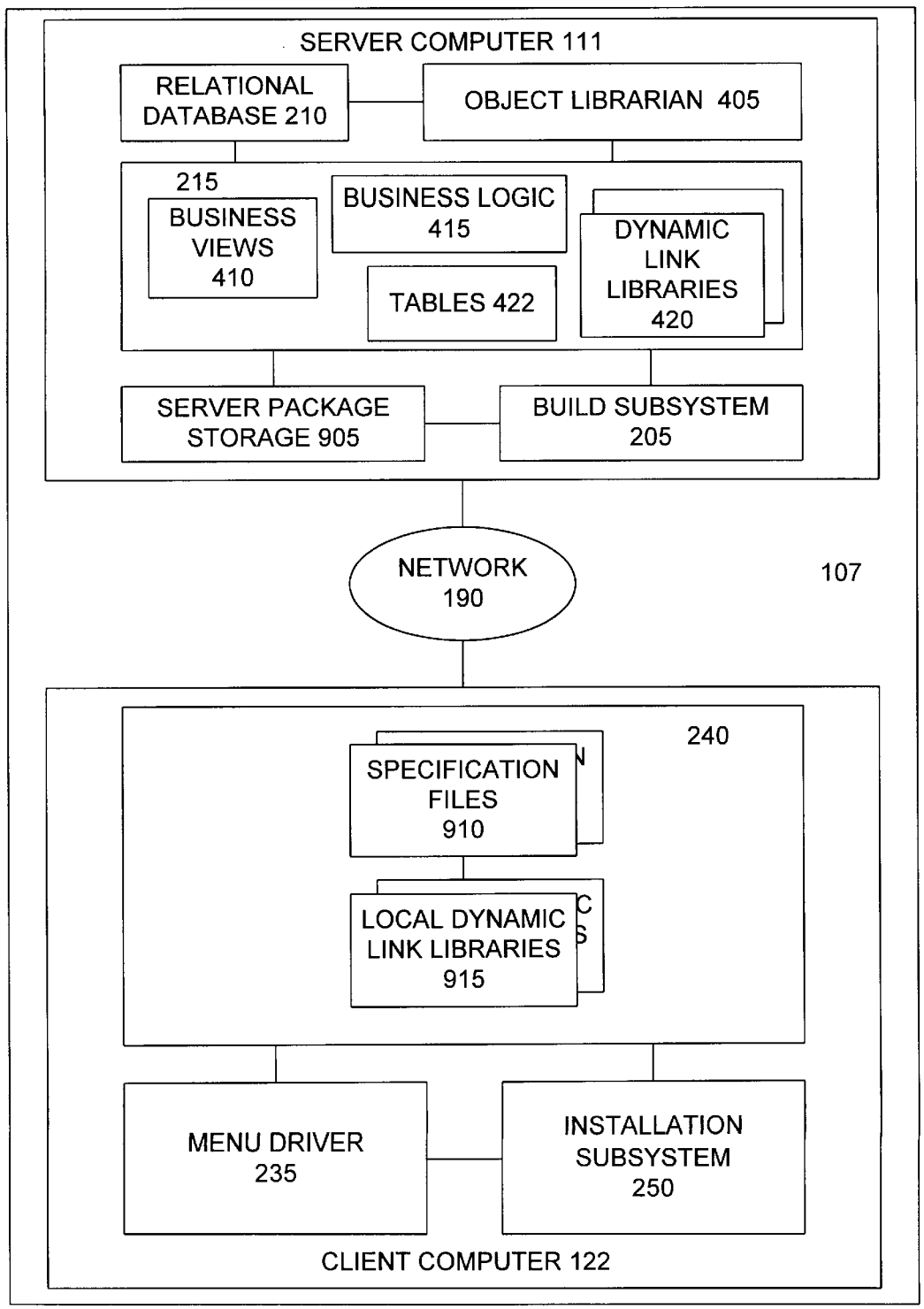
FIG. 9 is a block diagram illustrating an application package installation system in accordance with the present invention.

FIG. 9 is a block diagram illustrating an application package building and installation system 107 in accordance with the present invention. The application package building and installation system 107 includes the server computer 111 and the user client computer 122, both coupled to the network 190. The server computer 111 includes the relational database 210, the object librarian 405, the system application storage 215, and the server package storage 905, and the application package build subsystem 205, which are coupled together. The system application storage includes the business views 410, the business logic 415, and the DLLs 420. The components of the server computer 111 are functionally equivalent to those described in FIGS. 2 and 4 and the server package storage 905 is where application packages that are built for the client/server system 100 are stored. The build subsystem 205 assembles the applications into application packages.

The client computer 122 includes the menu driver 235, the installation subsystem 250, and the local application storage 240, all of which are coupled to one another. The local application storage 240 includes specification files 910 and local DLLs 915. The specification files 910 are where specification information such as business views, business logic, tables, and reports are stored for the application packages residing on the client computer 122. The local DLLs are the DLLs associated with the application modules of the application packages that are stored on the client computer 122.

FIG. 10 is a flow diagram illustrating the application package building process through the application package building and installation system 107 of FIG. 9 and the tables of FIGS. 7 and 8. The application package building process occurs through the build subsystem 205. The build subsystem 205 begins the process by reading 1010 the definition of a package from the package list, e.g., 810. The definition from the package list 810 includes the objects for the application package. The definition from the package list 810 is matched 1015 with the object library list 710. For example, referring to FIGS. 7 and 8, for the package 41PLUS in the package list 810 which is inventory plus time entry the objects from the object librarian list 710 are the inventory application suite 41, including the all the associated application modules, e.g., P4110, and the time entry application module P0610. The object type for the inventory application suite 41 is a suite (or system) and coded as SY, while the application type for the time entry application module P0610 is a module (or program) and coded as APPL. Thus, the object type from the package list 810 is matched to the appropriate field in the object library list 710. For example, the object and object type for the inventory application suite 41 (SY) is matched by first identifying that the object type is a suite (SY) and then the object is an application suite, specifically the inventory application suite identified as 41. Further, third party software applications may be included in the application package and are identified, for example, through their executable files under the object entry 840 in the package list 810. For example, package 06PLUS includes payroll plus the Microsoft Excel executable, EXCEL.EXE.

Turning back to FIG. 10, a list of matched suites and modules is created 1020 of all the application modules that are matched from the package list 710 and the object library list 810. At the time the package is being built, the application package building and installation system 107 builds the TAM files that will be used by the client computer 122. The TAM files are similar in structure and format as the TAM files described above in FIGS. 4 through 6. The application package building and installation system 107 builds the TAM files by reading the relational database 210 for the specifications associated with the application module, assembling all the specification information in the appropriate TAM file structure and placing each TAM file in a specification directory 424 in the server package storage 905.

For each package, after preparing the specification files, the DLL files of an application package and the executable files of a commercially available application are copied 1045 from the storage device of the server computer 111 to the client computer 122 storage device 155. If the system determines 1050 the installation is for a developer, the source code files are also copied 1055 from the storage device 155 of the server computer 111. The process creates 1060 a directory for the application package in the local application storage 240 on the storage device 155 of the client computer 122 and the copied files 1045, 1055 are stored 1065 within the newly created application package directory in the local application storage 240.

To further illustrate the installation process consider, for example, installation of the 41PLUS application package as described in FIGS. 7 and 8. The DLL files, the source files, the specification files, and other associated files for the inventory suite 41 and the time entry application modules P6010 would be placed in a 41PLUS application package directory in the server package storage 905 on the server 111. The application package that is created is now ready to be assigned to users of the system 100.

FIG. 11 is a table illustrating user definitions for users 1110 of the client/server system 100 in accordance with the present invention. The user definitions 1110 include the fields for a userid 1120 for providing a user identification, a description 1130 for describing the userid 1120, and a security identification 1140 for providing the user security level. The userid 1120 field provides the client/server system 100 with the list of users defined to access the client/server system 100. A user having a userid 1120, however, is not necessarily provided access to an application package created for client/server system 100.

FIG. 12 is a table illustrating one embodiment of package definitions for users 1210 of the client/server system 100 in accordance with the present invention. The package definitions for users 1210 provides users of the client/server system 100 as defined by the user definitions 1010, access to particular application packages. For each userid 1020, a one or more application packages 820 may be assigned. For example, user Ray Allen has a userid ALLENR and is assigned application package 06, which is the payroll suite. Further, user Joe Brown has userid BROWNJ and is assigned application package 41PLUS, which is the inventory suite plus the time entry application module from the payroll suite. Thus, the present invention has an advantage of installing on Joe Brown's client computer only the time entry application module without having to load the entire payroll suite just for the time entry portion. Therefore, storage resources are saved, plus additional security is provided because payroll functions such as check printing are not even installed on the client computer.

When a user is provided access to an application package and the application package is to be installed on that user's client computer 122, the application package is installed from the server computer 111 to the client computer 122. Specifically, referring back to FIG. 9, the application package is installed from the server package storage 905 to the local application storage 240 on the storage device 155 of the client computer 122. The installation subsystem 250 of the client computer 122 is used to install the application package from the server computer 111. The DLL files of the application package are copied from the server package storage 905 on the server computer 111 to the local application storage 240 on the client computer 122. The specification information associated with the application package is copied over as TAM files from server package storage 905 and stored as the specification files 910 in the local application storage 240 on the storage device 155. In a preferred embodiment of the present invention, the specification files 910 are a TAM file structure as described above in FIG. 6.

If the application package already exists at the client computer 122, but needs to have the application modules updated, the installation subsystem 250 will update only the changed application modules within the application package rather than reinstall the entire application package. The installation subsystem 250 determines whether the application package is an update through the type field 860 of the package list 810 indicating U for update. If the application package selected for installation is a U type application, only updated applications of the application package will be installed on the client computer 122.

In an alternative embodiment, an application package may be installed on a client computer 122 using a system and/or a method as described in the above-referenced U.S. patent application, Ser. No. 08/740,360, entitled "SYSTEM AND METHOD FOR INSTALLING APPLICATIONS ON AN As NEEDED BASIS", filed on Oct. 28, 1996, by Glenn S. Yinger, Charles E. McVaney, and James L. Foos, and which is hereby incorporated by reference.

The present invention includes a system and method for building custom application packages by packaging together application modules that may be combined with other application modules or application suites to provide selective functionality or a user of the client/server system 100. An advantage of the present invention is that system resource savings are attained such as saving storage space because whole application suites do not need to be installed merely to provide access to a particular application module. Moreover, because particular application modules may be installed for users rather than an entire application suite, an additional layer of system security is introduced where every user of the system does not need access to a whole application suite. In addition, the speed of application installation is increased because there are fewer application program files to install and there are typically fewer client computers 122 to update and install the application packages because not every user of the client/server system 100 needs access to every package.

In an alternative embodiment of the present invention, application packages may be entirely created and built on the server computer 111 and installed on the client computer 122. In another embodiment of the present invention, application packages may be created and built on the client computer 121, 122 and installed on the server computer 111.

While particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. In a computer system having a first node and a second node, a development system to build and install at least one custom application package, the development system comprising:

a relational database, coupled with the first node, for storing a plurality of application specifications;

a system application storage, coupled with the first node, for storing a plurality of system application components;

an object librarian, coupled with the relational database and the system application storage, for maintaining an inventory of objects, describing an object type for each object, and indicating the location of each object, an object comprised of at least one from the group of the plurality of application specifications and the plurality of system application components; and a build subsystem, coupled with the object librarian, for building an application package by selecting at least one object type, wherein in response to selecting the object type the build subsystem installing at the second node each object comprising the application package.

2. The development system as in claim 1, wherein the second node includes:

an application development tool for generating the plurality of application specifications; and at least one coding tool for generating at least one form, each form including at least one application specification from the plurality of application specifications, each form being an object.

3. The development system as in claim 1, further comprising a package storage, coupled with the build subsystem, for storing the application packages.

4. The development system as in claim 3, wherein the second node comprises:

a menu driver for selecting for execution an application module of an application package, the application package being a one of the application packages; and an installations subsystem, coupled to the menu driver, for installing at the second node the application package having the application module.

5. In a computer system having a first node and a second node, an application generation system to build and install an application package, comprising:

a database, coupled with the first node, for storing a plurality of application specifications, the at least one application specification defining a layout for at least one application form;

a system storage, coupled with the first node, for storing a plurality of application components including executables, at least one of the application components to define functionality for the at least one application form;

an object librarian, coupled to the database and the system storage, for defining an object having an object type, the object comprised of at least one from the group of the at least one application form and the plurality of application components; and a build subsystem, coupled to the object librarian, for selecting at least one object from the object librarian to build an application package.

6. The application generation system in claim 5, further comprising:

an installation subsystem, coupled with the second node, for installing the application package in the second node, including the object librarian identifying a location of each object in the first node comprising the application package for installation at the second node; and a local application storage, coupled to the installation subsystem, for storing the each object comprising the application package installed at the second node.

7. The application generation system in claim 6, further comprising a menu driver located in the second node and coupled to the installation subsystem and the local application storage for selecting the application package to install at the second node.

8. In a computer system having a first node and a second node, a method to build a custom application package for installation at the second node, the method comprising:

storing a plurality of application specifications in a relational database;

storing a plurality of application components in a system application storage;

defining at least one application form from at least one application specification and at least one application component;

defining at least one application module from at least one application form;

building an application package, the application package comprised of the at least one application module;

assigning the application package to a user of the computer system; and storing the application package in the first node for installation at the second node in response to the user selecting the application package.

9. The method a in claim 8, further comprises:

selecting an application package from a menu at the second node, the menu listing the application package file;

creating an application package directory at the second node in response to the application package not being at the second node; and copying the at least one specification file for the application package from the first node to the application package directory.

10. The method as in claim 8, wherein the defining the at least one application module further comprises, for each application module:

generating application code from the at least one application specification form;

compiling the application code to produce the at least one application module; and checking-in the at least one application module with an object librarian to obtain an inventory of each application form of the application module.

\* \* \* \* \*

UNITED STATES PATENT AND TRADEMARK OFFICE
CERTIFICATE OF CORRECTION

PATENT NO. : 5,950,010

DATED : September 7, 1999

INVENTOR(S) : Frederick W. Hesse and Patti J. Kato

It is certified that error appears in the above-identified patent and that said Letters Patent is hereby corrected as shown below:

Column 16, line 1, replace "a" with --as--.

Signed and Sealed this

Second Day of January, 2001

Attest:

Attesting Officer

Q. TODD DICKINSON
Commissioner of Patents and Trademarks